No. 12,027.

Reissued Sept. 2, 1902.

D. T. CROXTON.

CASTING APPARATUS.

(Application filed May 5, 1902.)

2 Sheets—Sheet 1.

Witnesses
E. R. Alexander
N. Curtis Lammond

David T. Croxton, Inventor
by H. H. Bliss
Attorney

No. 12,027.

Reissued Sept. 2, 1902.

D. T. CROXTON.

CASTING APPARATUS.

Application filed May 5, 1902.)

2 Sheets—Sheet 2.

Witnesses

E. P. Alexander

N. Curtis Lammond

Inventor

David T. Croxton, by H. H. Bliss, Attorney

UNITED STATES PATENT OFFICE.

DAVID T. CROXTON, OF CANAL DOVER, OHIO.

CASTING APPARATUS.

SPECIFICATION forming part of Reissued Letters Patent No. 12,027, dated September 2, 1902.

Original No. 650,373, dated May 29, 1900. Application for reissue filed May 5, 1902. Serial No. 106,097.

*To all whom it may concern:*

Be it known that I, DAVID T. CROXTON, a citizen of the United States, residing at Canal Dover, in the county of Tuscarawas and State of Ohio, have invented new and useful Improvements in Casting Apparatus, of which the following is a specification.

This invention relates to a casting apparatus, and has for its object to provide means for receiving, conveying, cooling, and loading the castings onto railway-cars or into other suitable receptacles simultaneously and by a continuous operation and by the same power or otherwise that operates the casting apparatus.

The nature and operations of this improvement will fully appear from the subjoined description when considered in connection with the accompanying drawings, in which—

Figure 1:
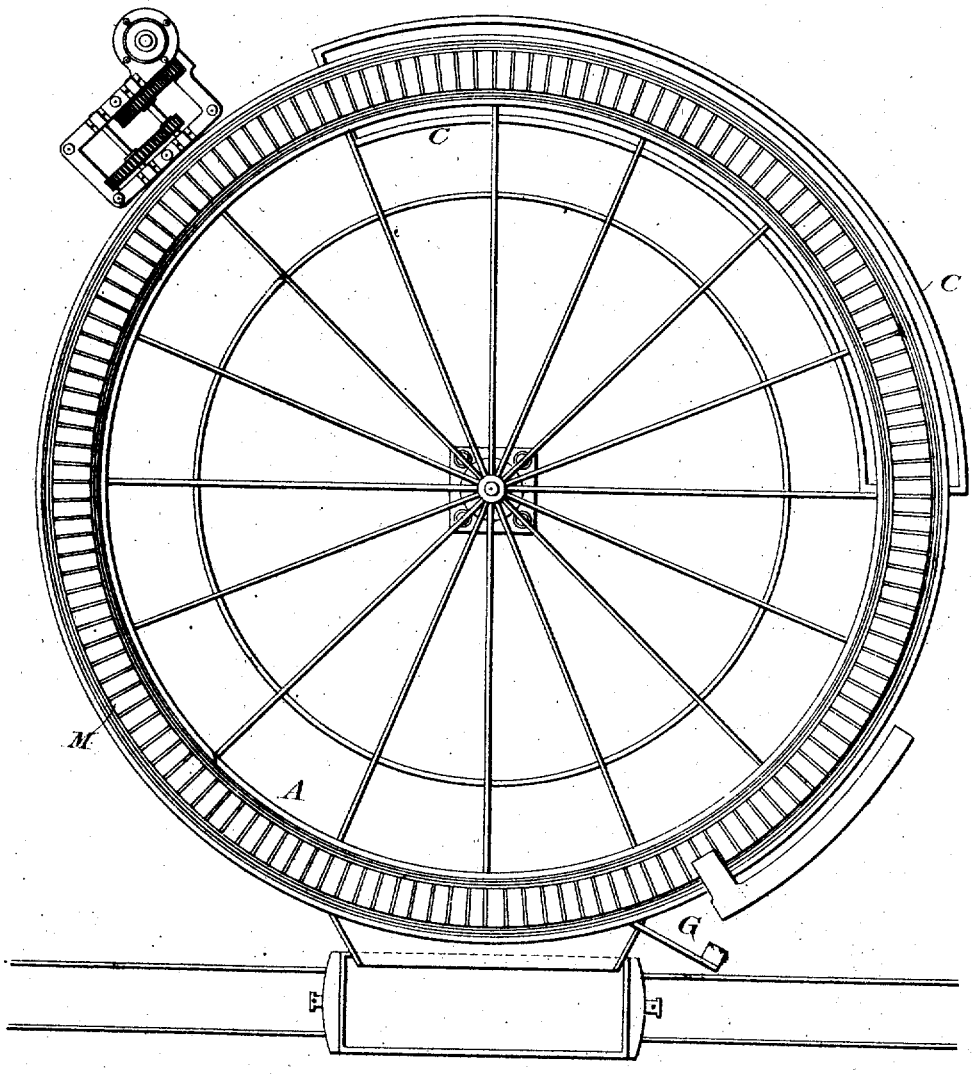
Figure 4:
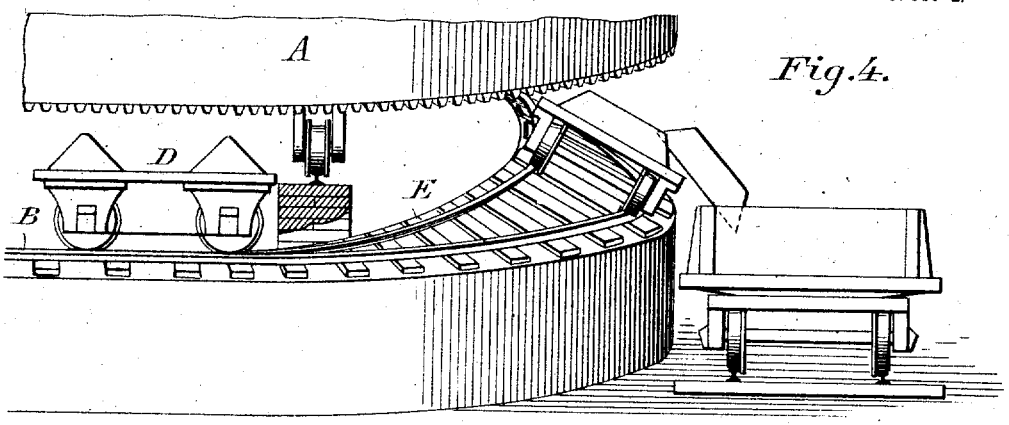
Figure 2:
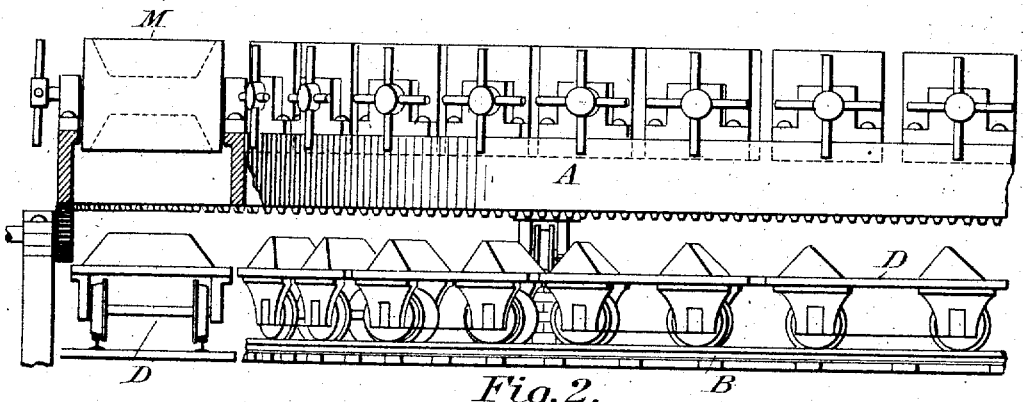
Figure 3:
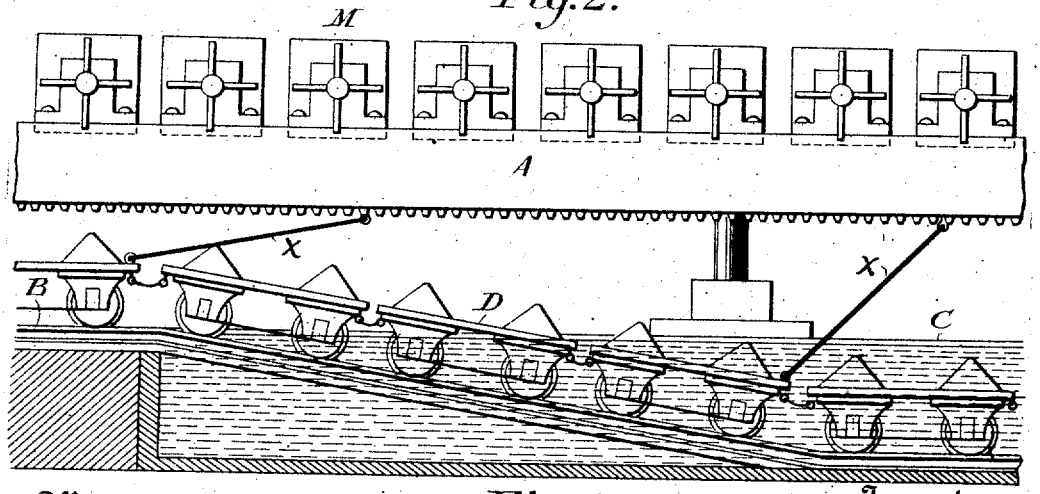

Figure 1 is a top or plan view of the aforesaid casting apparatus, my improvements being located underneath it. Fig. 2 is a side elevation of a part of the apparatus, showing the mold-support at the left in section, also showing a part of the circular railway-track and the cars that travel thereon, which receive and convey the ingots deposited thereon. Fig. 3 is a side elevation of the middle portion of the apparatus, showing the railway-track and cars thereon, having ingots thereon, also showing the water-tank in section and the track depressed therein through which the cars are traversed for cooling the ingots in transit. Fig. 4 is a side elevation of a part of the apparatus opposite that of Fig. 3, showing the track, having the inner rail elevated on an inclination for tilting the cars as they traverse said track for the purpose of discharging the ingots therefrom and depositing them into other railway-cars.

Like letters of reference indicate like parts throughout the several views.

A represents the rim of the wheel which supports the rotatable molds M M, which comprises the main feature of the said casting apparatus, Patent No. 620,020. My improvements, which operate conjunctively with said apparatus, are described as follows:

Under the rim of the wheel A is provided a rail-track B.

C is a water-tank, in the bottom of which a portion of the track is located, the track being depressed by means of inclines into each end of the tank. The purpose of the water-tank is for cooling the castings, as hereinafter described.

D D are cars or trucks coupled together to form a continuous or endless conveyer, which may be connected to the wheel by chains *x x* or other suitable means, whereby they may be hauled to travel upon the said track simultaneously with the movements of the wheel.

E, Fig. 4, represents the inner rail of the track raised in a curved line, by means of which the cars will be tilted in passing over it for discharging their loads by letting the castings slide off. At the side of the track may be located a bar or scraper G, which projects over the cars sufficiently to start the castings sliding in case of sticking or other causes.

From the foregoing the operations of this improvement are as follows: The casting apparatus is designed specially for casting metal into pigs in successive order, the revolving of the wheel giving time for the metal to partly cool. When the molds have been carried approximately a complete revolution, they are overturned and the pigs are dropped onto the cars. They are again conveyed around a second time, during which they are carried through the tank of water and are cooled off, and next they are discharged by the tilting of the cars riding over the inclined track. Thus the operations of casting the pigs, dropping them from the molds onto the receiver, conveying them, cooling them, and depositing them into suitable receptacles are all performed by one continuous and complete operation.

What I claim is—

1. In casting apparatus, in combination, a rotary wheel, molds rotatably mounted thereon, a track located beneath the casting-molds, cars or trucks coupled in a continuous endless chain, and connected to the rim of the mold-supporting wheel, a water-tank located in the car-track, and having the car-track depressed and attached to the bottom of said tank, whereby the cars will be drawn through the water for cooling the pigs, substantially as described.

2. In casting apparatus, in combination, a rotary wheel, molds rotatably mounted thereon, a track located beneath the casting-molds, cars or trucks coupled in a continuous endless chain, and connected to the rim of the mold-supporting wheel, a water-tank located in the car-track, and having the car-track depressed and attached to the bottom of said tank, and a portion of the rail on inside of the track elevated in a curved line, the arrangement being such that as the cars are drawn to travel on said track, they will pass through the tank for cooling the iron and also be tilted in passing over the elevated rail for unloading the cars, substantially as described.

3. In casting apparatus, in combination, a horizontally-arranged rotary carrier, molds mounted thereon and traveling in a circular path around the axis of the carrier, a cooling-chamber below the carrier for the pigs, and means supplemental to the mold-carrier traveling through the cooling-chamber in paths parallel to the path of the molds for advancing the pigs, substantially as set forth.

4. In casting apparatus, in combination, a horizontally-arranged rotary carrier, molds mounted thereon and traveling in a horizontal circular path around the axis of the carrier, a cooling-chamber formed on a curve around the axis of the carrier and adapted to hold a body of water and to receive the pigs from the mold, a conveyer moving through the water in said cooling-chamber in paths parallel to the path of the molds, means for imparting motion to the carrier and means for imparting motion to the conveyer in the cooling-chamber, substantially as set forth.

5. In casting apparatus, in combination, a horizontally-arranged rotary carrier, molds mounted thereon and traveling in a circular path around the axis of the carrier, a water-chamber below the carrier and means for moving the pigs through the water-chamber in paths curved around the axis of the carrier, substantially as described.

6. In casting apparatus, in combination a horizontally-arranged rotary carrier, molds mounted thereon and moving around the axis of the carrier, a cooling-chamber below the carrier, means for moving the pigs through the cooling-chamber in a path curved around the axis of the carrier, and means for causing the pigs to move away from the cooling-chamber on lines radial of the carrier, substantially as set forth.

7. In casting apparatus, in combination, a horizontally-arranged rotary carrier moving around a vertical axis, molds mounted thereon traveling around the axis of the carrier, a tank constituting more or less of an annular chamber arranged beneath the carrier substantially parallel to and directly under the path of the molds, a pig-receiving conveyer in the said tank and adapted to carry the pigs through the water in the said tank in a path around the axis of the carrier and means for causing the pigs to move from said carrier on lines radial of the said carrier, substantially as set forth.

8. In casting apparatus, in combination a horizontally-arranged rotary carrier moving around a vertical axis, molds mounted thereon traveling around said axis, a cooling-chamber beneath the carrier and arranged inside of the vertical lines of the carrier, and means for advancing the pigs through the cooling-chamber rotating around the axis of the carrier and means for causing the pigs to move in directions radial to the carrier, substantially as set forth.

9. In casting apparatus, in combination a horizontally-arranged rotary mold-carrier, molds mounted thereon, a carrier for the castings below the molds supported independently of the mold-carrier and arranged to move around the vertical axis of the mold-carrier, substantially as set forth.

10. In casting apparatus, in combination, a horizontally-arranged rotary mold-carrier, molds mounted thereon, a horizontally-moving carrier for the castings below the mold-carrier consisting of a series of sections arranged in a circular series and arranged to travel around the vertical axis of the mold-carrier, and said sections being capable of movement relatively to the mold-carrier, substantially as set forth.

11. In casting apparatus, in combination a horizontally-arranged rotary mold-carrier, molds mounted thereon, a horizontally-moving carrier for the castings below the mold-carrier consisting of a series of sections arranged in a circular series and arranged to travel around the vertical axis of the mold-carrier and a support for the castings-carrier having a section in a relatively lower horizontal plane, a section in a relatively higher horizontal plane, and sections connecting the higher to the lower sections, whereby the castings-carrier when moving around the said axis is caused to travel in different horizontal planes, substantially as set forth.

12. In casting apparatus, in combination, a horizontally-arranged rotary mold-carrier, molds mounted thereon, a horizontally-moving carrier for the castings below the molds and arranged to move around the vertical axis of the mold-carrier and a support for the castings-carrier having a lower section, a higher section, and intermediate connecting-sections, and means for causing the castings-carrier to move around the vertical axis of the mold-carrier, substantially as set forth.

In testimony whereof I have hereunto signed my name, in the presence of two witnesses, this 15th day of April, 1902.

DAVID T. CROXTON.

Witnesses:

R. FORWARD, Jr.,

W. B. DARREK.